INVENTOR.
LLOYD T. HENDRIX
BY Donald W Canady
ATTORNEY

United States Patent Office 3,335,549
Patented Aug. 15, 1967

3,335,549
WELL EFFLUENT SEPARATION APPARATUS
Lloyd T. Hendrix, Santa Ana, Calif., assignor to Atlantic Richfield Company, a corporation of Pennsylvania
Filed Feb. 17, 1965, Ser. No. 433,386
2 Claims. (Cl. 55—178)

The present invention relates to well effluent separators. The effluent from oil wells is a mixture of liquids and gases which need to be separated before the products are pumped to their destination, since the presence of a large amount of gas in the liquid crude oil makes pumping inefficient. In order to accomplish this separation, it is conventional to pass the well effluent through various devices at or quite near the well site.

However, well fluid separators now in use are not entirely effective. Particular difficulty is encountered where the effluent is somewhat emulsified in the form of a foam. Conventional separator units also have been unsatisfactory in their scrubbing action and the foam tends to foul the scrubbing elements.

Accordingly, a principal object of the present invention is to provide a new and improved well effluent separator which efficiently separates liquids and gases from foamy liquid feed materials and which is also highly efficient in scrubbing the resultant gases.

A further object of my present invention is to provide a well effluent separator which has a reduced tendency to foul.

It is also an object of my present invention to provide a method for efficiently separating liquids and gases contained in a foamy well effluent and scrubbing the separated gases.

The present invention will be more fully appreciated in view of the following detailed description thereof and a method of operation, and by reference to the accompanying drawings, wherein.

Figure 1:
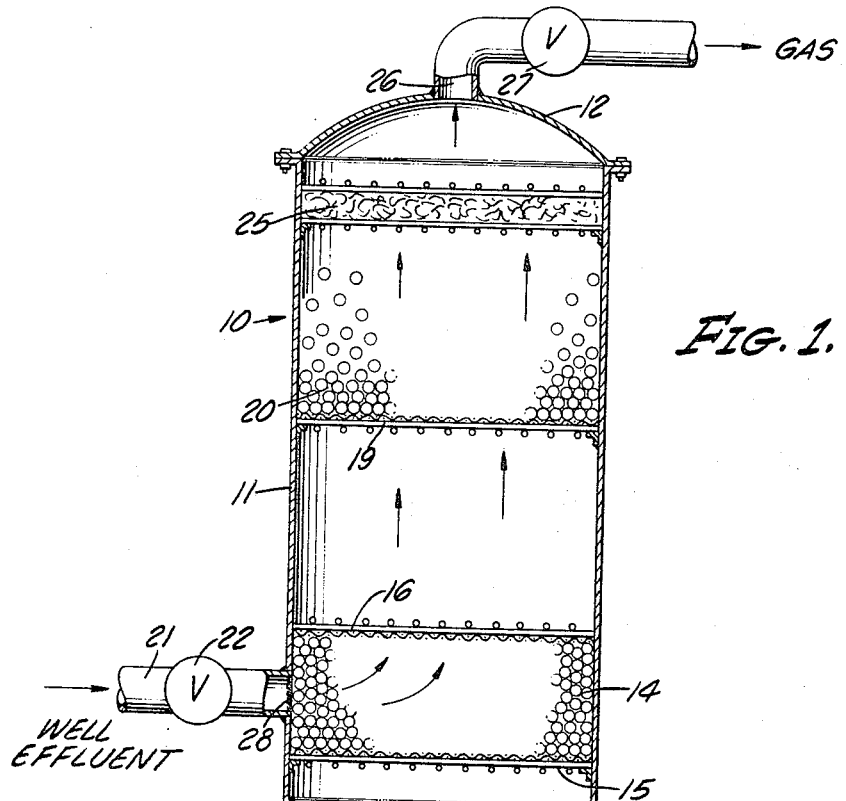
FIG. 1 is a side-cross-sectional view of a preferred embodiment of a well effluent separator in accordance with the present invention.

Referring to FIG. 1, it will be seen that the well effluent separator 10 may comprise an elongated tank 11 arranged with its long axis in a substantially vertical position and having top and bottom closures or heads 12 and 13, respectively. Tank 11 as shown with bolted heads is satisfactory for relatively low pressure usage, however, conventional welded heads with manways would be utilized for high pressure usage.

Near the lower end of the tank there is positioned a bed 14 of spheres or balls which rest upon a supporting grid or plate 15. Grid 15 has small openings therein (not shown) so that liquid may pass through the grid and enter the bottom of the tank.

Above bed 14 in tank 11 is positioned a hold-down or restraining grid 16 which also has small openings (not shown) which permit the passage of liquid or vapors. Grid 16 is not essential to the operation of the device, but it helps to confine the spheres of bed 14 to a relatively limited zone in the lower portion of the tank.

Another supporting grid or plate 19 is positioned in tank 11 above bed 14. Grid 19 also has small openings therein (not shown) which will permit the passage of liquid or vapors. Bed 20 is supported on grid 19 and comprises relatively light balls or spheres having a density which permits them to be elevated or buoyed by vapors passing through the openings in grid 19.

A metal mesh 25 is positioned across the tank 11 near its upper end. Mesh 25 is sufficiently porous so that vapors may pass upwardly through it and out conduit 26 which is controlled by valve 27.

A conduit 21 for admitting the well effluent into bed 14 is provided on the side of the tank and is controlled by valve 22. A liquid permeable screen element 28 covers the junction of the tank 11 with conduit 21 to prevent spheres from bed 14 from entering conduit 21.

A conduit 23 controlled by valve 24 is positioned in the lower closure 13 of the tank so that liquids gravitating to the bottom of the tank may be withdrawn.

In operation, and referring to a particular tank such as shown in FIG. 1 having a capacity of approximately 200 gallons, well effluent is passed through valve 22 and conduit 21 into bed 14 at the rate of approximately from 1000 to 2000 gallons per hour. Upon contacting the spheres in bed 14, the foam in the liquid is broken, that is, the gas is driven out of the liquid. The heavy liquid flows downwardly through the openings in supporting grid 15 and is withdrawn through conduit 23 and valve 24.

The spheres or balls in bed 14 may be made of any relatively impervious, non-adherent material such as polypropylene or polyethylene which will spread bitumens out by wetting. Since the balls are able to rotate and thus tend to be self-cleaning, the present separator has a reduced tendency to foul when compared to prior are devices.

The well effluent separator of my present invention is believed to be more efficient than prior devices in breaking foamy liquids and in scrubbing the vapors for two reasons: (1) a large amount of surface area is provided to spread the liquid interface of the bubbles and (2) movement of the balls in effect makes their effective surface larger than a comparable fixed surface.

The sphere may have a diameter of from about ½ inch to 2 inches. Although the material in bed 14 is preferably a series of spheres or balls, other solid shapes such as tubes or cylinders could be employed, but they are not expected to be as efficient.

The gas and vapors which rise up through grid 16 have a substantial amount of liquid still entrained in them. As these vapors pass through grid 19, they encounter the low density beads or spheres in bed 20 and additional liquids are scrubbed out of the gases. These beads or spheres have a density from about 10 to 20 pounds/cubic foot of displacement and may comprise polypropylene in spheres having a diameter of from ½ to 2 inches.

The vapors passing through grid 16 have liquids and sometimes bitumens dissolved or suspended in the liquid droplets. The balls in bed 20 serve to reduce the deposition of bitumen in the mesh by providing a surface on which the liquids can coalesce and by aiding in washing the liquids back into the liquid section. The active surface of the balls tends to prevent bitumen from adhering to the balls or bubbles forming which are the source of fine particles when they break. The agglomerated liquid drips back down through grid 19 to be removed eventually through conduit 23.

In contact with the scrubbing bed 20, the vapors tend to carry the spheres upwardly so the contact between vapors and spheres is over an extended period. This greatly enhances the efficiency of the coalescence and reovery of additional liquid from the vapor stream.

The scrubbed vapors then may be passed through a final scrubbing element located in tank 11, such as a metal mesh 25. This mesh may be of a stainless steel, and the mesh in conventionally about 4 inches thick, 12 pounds/cubic foot, 0.011 inch diameter wire, e.g. York Mesh Type 421.

On passing through the final scrubbing element, the vapors are then withdrawn through conduit 26 and valve 27. The gas product generally comprises light petroleum gases, such as a mixture of methane, ethane and propane.

Any well effluent, input or feed material may be treated in accordance with this invention.

The final scrubbing element 25 in tank 11 may be omitted or replaced with a packing material, a cyclone unit or a scrubbing device other than metal mesh.

Figure 2:
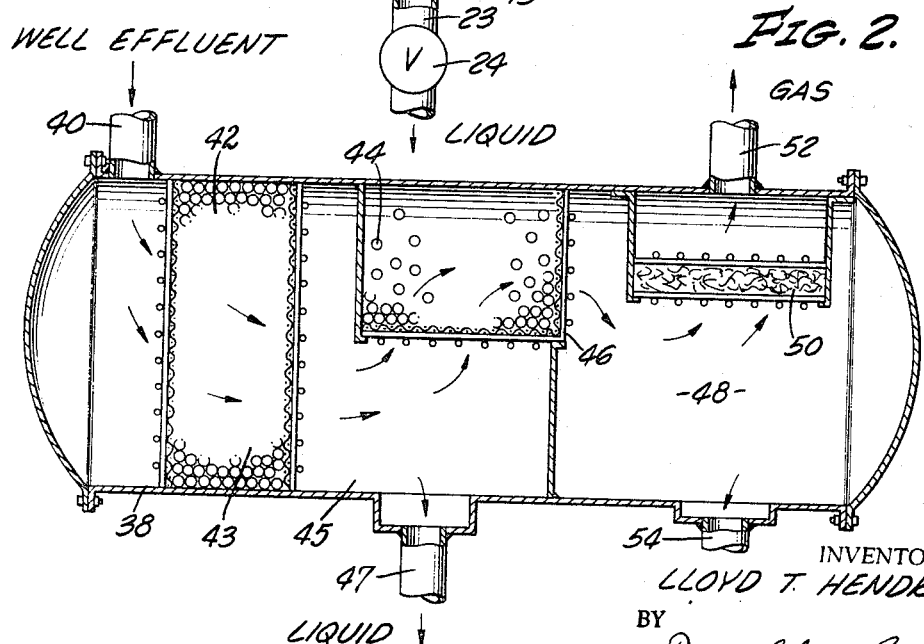
FIG. 2 shows a horizontally disposed effluent separator in cross-sectional view.

In FIG. 2 a horizontally disposed separator 38 is shown, in accordance with a modification of my present invention. The separator 38 is divided essentially into three horizontal compartments 43, 45, and 48. The well effluent enters the separator through conduit 40 and passes through first compartment 43 which comprises a bed 42 of spheres similar to those in bed 14 (of FIG. 1), and thence into the second compartment 45 through bed 44 of relatively low density spheres. Liquids removed from the effluent in beds 42 and 44 are removed from the vessel 38 through conduit 47. The vapors pass from bed 44 through grid 46 into the third compartment 48 and thence up through the conventional scrubbing element 50 which is positioned in the third compartment. The scrubbed vapors after passing through scrubbing element 50 are removed from the vessel 38 through conduit 52, with liquid drop-out being removed through drain 54 of compartment 48.

As will be well understood by those skilled in the art, various modifications may be made in the structure and arrangement of the overall device and of individual elements in the device as shown and described herein. However, it will also be well understood that such minor changes and variations may be made without departing from the central spirit or scope of the present invention as defined in the following claims.

I claim:
1. A well effluent separator for separating vapors comprising:
   an elongated chamber, said chamber having top and bottom closure elements,
   a first bed of spherical members positioned in the vicinity of the bottom of said chamber,
   upper and lower means in said chamber for containing said first bed,
   a second bed of spheres positioned in said chamber above said first bed,
   upper and lower means in said chamber for containing said second bed,
   The space between said upper and lower containing means of said second bed being sufficient to permit said second bed spheres to be carried upwardly by said vapors rising through said second bed,
   said spheres in said second bed normally resting on said lower containing means and being of relatively low density so that they may be carried upwardly in said chamber with said vapors, said upper means for containing said first bed and said lower means for containing said second bed being spaced apart to define a free unobstructed passage space between said first and second beds for the flow of vapors from said first bed to said second bed,
   means for admitting a well effluent directly into contact with the spheres in said first bed to break any foam present in the well effluent, means for withdrawing liquid from said first bed,
   a scrubbing element so arranged in said chamber that said vapors passing from said second bed pass through said element, and means for withdrawing from the top of said chamber, said vapors passing through said scrubbing element.

2. A well effluent separator comprising:
   an elongated chamber having a horizontal axis, said chamber having end closure elements,
   means for admitting a foamy, bitumen-containing well effluent feed into said elongated chamber near one end thereof,
   a bed of foam breaking spherical members in a first horizontal compartment in said chamber, said bed being so arranged that said admitted feed passes therethrough in a substantially horizontal flow path through said compartment,
   a second bed of relatively low density bitumen removing spheres, in a second horizontal compartment in said chamber, said second bed being horizontally spaced from said first bed and so arranged in said chamber that said well effluent passing through said first bed passes first through a free unobstructed space in said second compartment and then through said second bed,
   a scrubbing element in a third compartment in said chamber, said scrubbing element being horizontally spaced from said second bed and so arranged in said chamber that said gas passing from sad second bed passes through said scrubbing element,
   means at the bottom of said chamber for withdrawing liquid from said compartments, and
   means for withdrawing the gas passing through said scrubbing element from said chamber.

References Cited

UNITED STATES PATENTS

| 2,518,845 | 5/1945 | Williams | 55—178 |
| 2,758,665 | 8/1956 | Francis | 55—183 |
| 3,025,928 | 3/1962 | Heath | 55—183 X |
| 3,122,594 | 2/1964 | Kielback | 261—94 |
| 3,219,324 | 11/1965 | Williams et al. | 261—95 |

REUBEN FRIEDMAN, *Primary Examiner.*

R. W. BURKS, *Assistant Examiner.*